United States Patent
Andersson (10) Patent No.: US 11,744,222 B2
(45) Date of Patent: Sep. 5, 2023

(54) CARTRIDGE CONFIGURED TO FORM A PART OF A TEATCUP, AND A TEATCUP

(71) Applicant: DELAVAL HOLDING AB, Tumba (SE)

(72) Inventor: Anna Andersson, Tumba (SE)

(73) Assignee: DeLaval Holding AB, Tumba (SE)

( * ) Notice: Subject to any disclaimer, the term of this patent is extended or adjusted under 35 U.S.C. 154(b) by 228 days.

(21) Appl. No.: 16/651,310

(22) PCT Filed: Oct. 23, 2018

(86) PCT No.: PCT/SE2018/051080
§ 371 (c)(1),
(2) Date: Mar. 26, 2020

(87) PCT Pub. No.: WO2019/083433
PCT Pub. Date: May 2, 2019

(65) Prior Publication Data
US 2020/0267926 A1    Aug. 27, 2020

(30) Foreign Application Priority Data

Oct. 26, 2017 (SE) .................................. 1751322-7

(51) Int. Cl.
*A01J 5/06* (2006.01)
*A01J 5/08* (2006.01)

(52) U.S. Cl.
CPC .. *A01J 5/06* (2013.01); *A01J 5/08* (2013.01)

(58) Field of Classification Search
CPC ........ A01J 5/00; A01J 5/04; A01J 5/06; A01J 5/08; A01J 5/16
See application file for complete search history.

(56) References Cited

U.S. PATENT DOCUMENTS

| 807,372 | A |   | 12/1905 | Gillies |
|---|---|---|---|---|
| 832,374 | A | * | 10/1906 | Gillies ...................... A01J 5/08 101/396 |

(Continued)

FOREIGN PATENT DOCUMENTS

| CN | 2341929 Y | 10/1999 |
|---|---|---|
| CN | 2408063 Y | 11/2000 |

(Continued)

OTHER PUBLICATIONS

Office Action issued in Chinese Patent Application No. 201880065187.X dated Aug. 24, 2021.

(Continued)

*Primary Examiner* — Magdalena Topolski
(74) *Attorney, Agent, or Firm* — NIXON & VANDERHYE (57) ABSTRACT

A teatcup, configured to be attached to the teat of an animal to be milked, and a cartridge for said teatcup, where the cartridge has an elongated sleeve with having an upper end section and a lower end section, and a barrel that is premounted in the elongated sleeve (8) and forming an inner space for receiving the teat such that a pulsation chamber is formed between the elongated sleeve and the barrel, where the cartridge also has a head member at the upper end section with a lip surrounding an opening into the inner space, where the elongated sleeve has a flange extending outwardly at the upper end section, and the head member has a plurality of locking members each configured to grip the flange, each of the locking members extending towards the lower end section and beyond the flange.

12 Claims, 5 Drawing Sheets

(56) References Cited

U.S. PATENT DOCUMENTS

| | | | | |
|---|---|---|---|---|
| 1,213,814 A * | 1/1917 | Anderson | | A01J 5/08 119/14.47 |
| 1,231,748 A | 7/1917 | Kricke | | |
| 1,249,134 A * | 12/1917 | Leitch | | A01J 5/08 119/14.51 |
| 1,256,792 A * | 2/1918 | Harner | | A01J 5/08 119/14.47 |
| 1,269,361 A | 6/1918 | Zeratsky et al. | | |
| 1,425,584 A * | 8/1922 | Gessler | | A01J 5/08 119/14.49 |
| 1,601,145 A * | 9/1926 | Remy | | A01J 5/08 119/14.5 |
| 1,620,916 A | 3/1927 | Pessell | | |
| 1,916,839 A | 7/1933 | Hulbert | | |
| 2,073,737 A * | 3/1937 | Ellison | | A01J 5/06 119/14.49 |
| 2,300,833 A * | 11/1942 | Scott | | A01J 5/08 119/14.53 |
| 2,340,295 A * | 2/1944 | Bender | | A01J 5/08 119/14.36 |
| 2,408,390 A * | 10/1946 | Gessler | | A01J 5/08 119/14.49 |
| 2,462,583 A * | 2/1949 | Weiby | | A01J 5/08 119/14.47 |
| 3,079,891 A * | 3/1963 | Miller | | A01J 5/08 119/14.45 |
| 3,158,136 A * | 11/1964 | George | | A01J 5/08 119/14.52 |
| 3,485,212 A * | 12/1969 | McAndrew | | A01J 5/06 119/14.49 |
| 3,874,338 A | 4/1975 | Happel | | |
| 4,393,811 A | 7/1983 | Bodmin | | |
| 4,459,939 A * | 7/1984 | Noorlander | | A01J 5/08 119/14.49 |
| 4,530,307 A * | 7/1985 | Thompson | | A01J 5/08 119/14.49 |
| 5,007,378 A * | 4/1991 | Larson | | A01J 5/08 119/14.47 |
| 5,069,162 A * | 12/1991 | Thompson | | A01J 5/08 119/14.47 |
| 5,317,988 A * | 6/1994 | Hoefelmayr | | A01J 5/08 119/14.47 |
| 6,058,879 A * | 5/2000 | Miefalk | | A01J 5/08 119/14.47 |
| 9,635,829 B2 * | 5/2017 | La Torre | | A01J 5/08 |
| 10,130,068 B2 | 11/2018 | La Torre et al. | | |
| 11,116,173 B2 * | 9/2021 | Samuelsson | | A01J 5/08 |
| 2015/0075434 A1 * | 3/2015 | Lidmar | | A01J 5/00 119/14.5 |
| 2015/0090183 A1 * | 4/2015 | Hedlund | | A01J 5/06 119/14.47 |
| 2016/0007559 A1 * | 1/2016 | Andersson | | A01J 5/041 119/14.46 |
| 2016/0066531 A1 | 3/2016 | La Torre et al. | | |
| 2017/0284583 A1 | 10/2017 | Eckard et al. | | |
| 2019/0124880 A1 | 5/2019 | Samuelsson | | |

FOREIGN PATENT DOCUMENTS

| | | | | |
|---|---|---|---|---|
| CN | 103807542 A | | 5/2014 | |
| CN | 104540490 A | | 4/2015 | |
| CN | 106793764 A | | 5/2017 | |
| DE | 922447 C | * | 1/1955 | |
| DE | 19811534 A1 | * | 9/1999 | A01J 5/08 |
| EP | 0105206 A1 | | 4/1984 | |
| EP | 1219166 A2 | * | 7/2002 | A01J 5/007 |
| EP | 1352557 A1 | * | 10/2003 | A01J 5/08 |
| FR | 2605840 A1 | * | 6/1988 | |
| GB | 669488 A | * | 4/1952 | |
| GB | 919563 A | * | 2/1963 | |
| GB | 1208679 A | | 10/1970 | |
| JP | 2003-517316 A | | 5/2003 | |
| WO | 01/45498 A1 | | 6/2001 | |
| WO | 2014178783 A1 | | 11/2014 | |
| WO | 2017/192092 A1 | | 11/2017 | |

OTHER PUBLICATIONS

SE Search Report, dated May 9, 2018, from corresponding SE application No. 1751322-7.

International Search Report, dated Jan. 21, 2019, from corresponding PCT application No. PCT/SE2018/051080.

Office Action issued in Japanese Patent Application No. 2020-510564 dated Aug. 23, 2022.

* cited by examiner

CARTRIDGE CONFIGURED TO FORM A
PART OF A TEATCUP, AND A TEATCUP

TECHNICAL FIELD OF THE INVENTION

The present invention refers generally to a cartridge, which, together with a connector, forms a teatcup to be attached to the teat of an animal to be milked. More specifically, the present invention refers to a cartridge according to the preamble of claim 1.

Furthermore, the present invention refers to a teatcup configured to be attached to the teat of an animal to be milked and comprising a connector and a cartridge.

BACKGROUND AND PRIOR ART

WO 2014/178783 discloses a cartridge configured to be received in a connector of a teatcup to be attached to the teat of an animal to be milked. The cartridge comprises an elongated sleeve having an upper end and a lower end, a barrel mounted in the elongated sleeve and having an inner space for receiving the teat, and a pulsation chamber provided between an inner side of the elongated sleeve and an outer side of the barrel. The barrel comprises an upper end portion located at the upper end of the elongated sleeve, a barrel portion and a lower end portion extending beyond the lower end of the elongated sleeve. A lip member is attached to a flange of the barrel by means of a snap connection.

When handling the cartridge, for instance inserting the cartridge into a connector of the teatcup or when removing the cartridge from the connector, it could happen that the barrel is rotated in relation to the elongated sleeve, especially when the insertion and/or the removal includes a rotary movement. The barrel may then be twisted so that the straight, approximately cylindrical shape is deformed. Such twisting significantly decreases the performance of the barrel. This is a problem for various kinds of barrels, such as when the barrel portion of the barrel has a circular cross-sectional shape, and in particular when the barrel portion of the barrel, at least in a rest state, has a polygonal cross-sectional shape defining a plurality of corner portions and a plurality of side portions, each connecting two of said corner portions. Such polygonal barrels are very sensible to twisting.

SUMMARY OF THE INVENTION

The object of the present invention is to remedy the problems discussed above, and to provide an improved cartridge for a teatcup. In particular, it is aimed at a cartridge in which the risk of twisting of the barrel in relation to the elongated sleeve is reduced, or avoided. Furthermore, it is aimed at a secure attachment of a head member comprising the lip to the cartridge, to the elongated sleeve of the cartridge.

This object is achieved by the cartridge initially defined, which is characterized in that the elongated sleeve has a flange extending outwardly at the upper end section, that the head member comprises a plurality of locking members each gripping the flange, and that each of the locking members extends towards the lower end section and beyond the flange.

The locking members extending beyond and gripping the flange secure the attachment of the head member on the cartridge even if the head member and the teatcup is subjected to powerful forces in various directions. The plurality of locking members gripping the flange may prevent the head member from being rotated in relation to the elongated sleeve, and thus the head member cannot rotate or twist the barrel.

According to an embodiment of the invention, the number of locking members is at least three, preferably at least four. With three or four locking members lifting of a peripheral part of the head member may be prevented.

According to an embodiment of the invention, the locking members are separated from each other, preferably equidistantly separated from each other. The locking members may thus be uniformly distributed along the periphery of the head member.

According to an embodiment of the invention, each of the locking members comprises an inwardly extending portion which comprises an engagement surface turned away from the lower end section. Each of the locking members may thus be configured as a hook. The engagement surfaces may thus engage a lower side surface of the flange in order to enhance the attachment of the head member to the elongated sleeve.

According to an embodiment of the invention, each of the engagement surfaces is parallel, or substantially parallel, with a radial plane, i.e. a plane being radial in relation to the longitudinal central axis.

According to an embodiment of the invention, the flange is annular and comprises a lower surface turned towards the lower end section, wherein each of the engagement surfaces abuts the lower surface. The engagement surfaces may form a large abutment area with the lower surface, further enhancing the attachment of the head member to the elongated sleeve.

According to an embodiment of the invention, the lower surface of the flange is parallel, or substantially parallel, with a radial plane, i.e. a plane being radial in relation to the longitudinal central axis.

According to an embodiment of the invention, the head member is attached to the barrel. The head member and the barrel may thus form a unit, which is introduced into the elongated sleeve to form the cartridge, which together with the connector may form the teatcup.

According to an embodiment of the invention, the head member comprises a lip element, comprising the lip, and a ring member attached to the lip element and comprising the locking members and an engagement element, wherein the engagement element attaches the head member to the barrel. The engagement element may thus secure a firm attachment of the head member to the barrel.

According to an embodiment of the invention, the engagement element engages the barrel by extending inwardly into a groove in the barrel, preferably a circumferential groove.

According to an embodiment of the invention, the flange comprises a plurality of recesses, wherein each of the locking members is received in a respective one of the recesses. The recesses receiving a respective one of the locking members enhance the attachment of the head member in a peripheral direction and thus further reduces the risk of rotation of the head member in relation to the elongated sleeve.

According to an embodiment of the invention, the number of recesses is the same as the number of locking members, i.e. in particular at least three, or at least four recesses.

According to an embodiment of the invention, the flange has an upper surface facing away from the lower end section and wherein each of the recesses extends through the upper surface and in parallel with the longitudinal central axis.

According to an embodiment of the invention, the recesses are separated from each other, preferably equidistantly separated from each other. The recesses may thus be uniformly distributed along the periphery of the flange.

According to an embodiment of the invention, each of the recesses has a tapering shape towards the lower end section, wherein each of the locking members has a corresponding tapering shape towards the lower end section. The tapering shape of the recesses and the locking members facilitates introduction of the locking members into the recesses, and contributes to firm engagement of the locking members in the respective recess.

According to an embodiment of the invention, the connector comprises a lower base member and a shell that extends from the lower base member and surrounds a receiving space of the connector.

According to an embodiment of the invention, the lower base member and the shell are made of one piece, preferably of a plastic material.

According to an embodiment of the invention, the locking members are located inside and adjacent to an inner surface of the shell when the cartridge is received in the receiving space of the connector. The shell may thus prevent the locking members from moving radially outwardly, and thus from leaving their gripping of the flange, and in particular from leaving their position in the respective recess.

According to an embodiment of the invention, a plurality of coupling members are provided on an outer surface of the elongated sleeve and a plurality of complementary coupling members are provided on an inner surface of the connector, wherein each of the coupling members form a bayonet coupling with a respective one of the complementary coupling members to permit locking of the cartridge in the connector. Such a bayonet coupling may securely prevent the cartridge from being disconnected from the connector, for instance when the teatcup is attached to the teat of the animal being milked.

According to an embodiment of the invention, a passage is provided between each of the coupling members to permit a respective one of the complementary coupling members to pass axially beyond the coupling members when the cartridge is introduced into the receiving space of the connector. The cartridge may thus be introduced into the connector along a straight path in parallel with the longitudinal central axis. When the cartridge has reached its final axial position it may be rotated in relation to the connector, wherein the coupling members and complementary coupling members may engage each other.

According to an embodiment of the invention, each of the coupling members comprises an upper surface turned away from the lower end section to permit engagement by a lower surface of the complementary coupling member. The upper surface may thus slide on a lower surface of the complementary coupling member during said rotation of the cartridge in relation to the connector.

According to an embodiment of the invention, at least one of the coupling members and complimentary coupling members comprises a stop surface to provide a final rotary position. The stop surface defines the final rotary position of the cartridge after said rotation of the cartridge in relation to the connector. The stop surface may be parallel with the longitudinal central axis. The stop surface may extend from the upper surface of the coupling member or from the lower surface of the complimentary coupling member.

According to an embodiment of the invention, at least one of the coupling members and complementary coupling members comprises a sloping ramp to permit sliding of the complementary coupling member onto the upper surface. The sloping ramp may facilitate for the upper surface of the coupling member of the cartridge to reach the lower surface of the complementary coupling member of the connector, and thus the initial part of said rotation of the cartridge in relation to the connector. The sloping ramp may extend to the upper surface of the coupling member or to the lower surface of the complementary coupling surface.

The object is also achieved by the teatcup initially defined, which comprises a cartridge as described above.

BRIEF DESCRIPTION OF THE DRAWINGS

The present invention is now to be explained more closely through a description of various embodiments and with reference to the drawings attached hereto.

DETAILED DESCRIPTION OF VARIOUS EMBODIMENTS

FIGS. 1 to 4 disclose a teatcup to be attached to the teat of an animal to be milked. The teatcup comprises a cartridge 1, see also FIG. 5, and a connector 2, see also FIG. 6.

Figure 1:
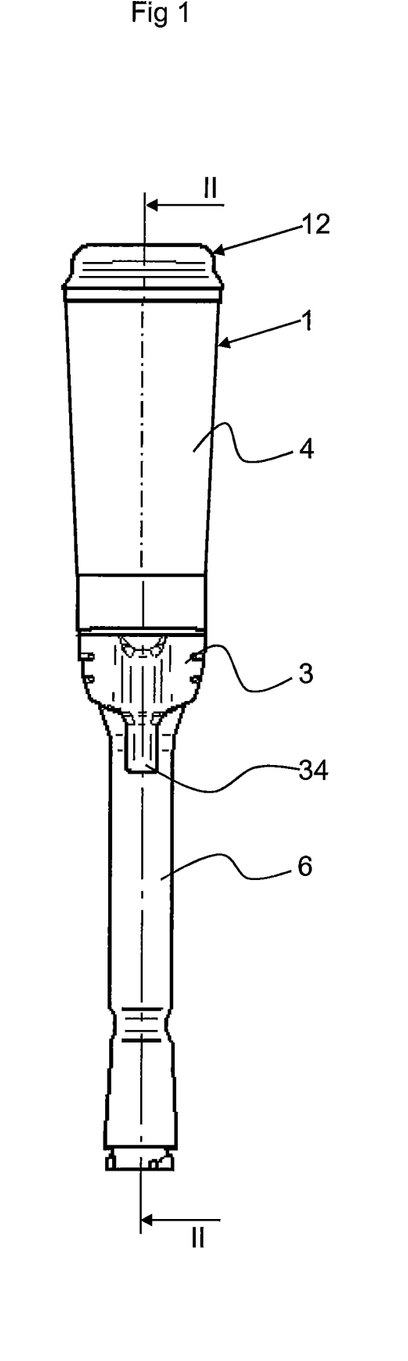
FIG. 1 discloses a side view of a teatcup according to an embodiment of the invention.
Figure 2:
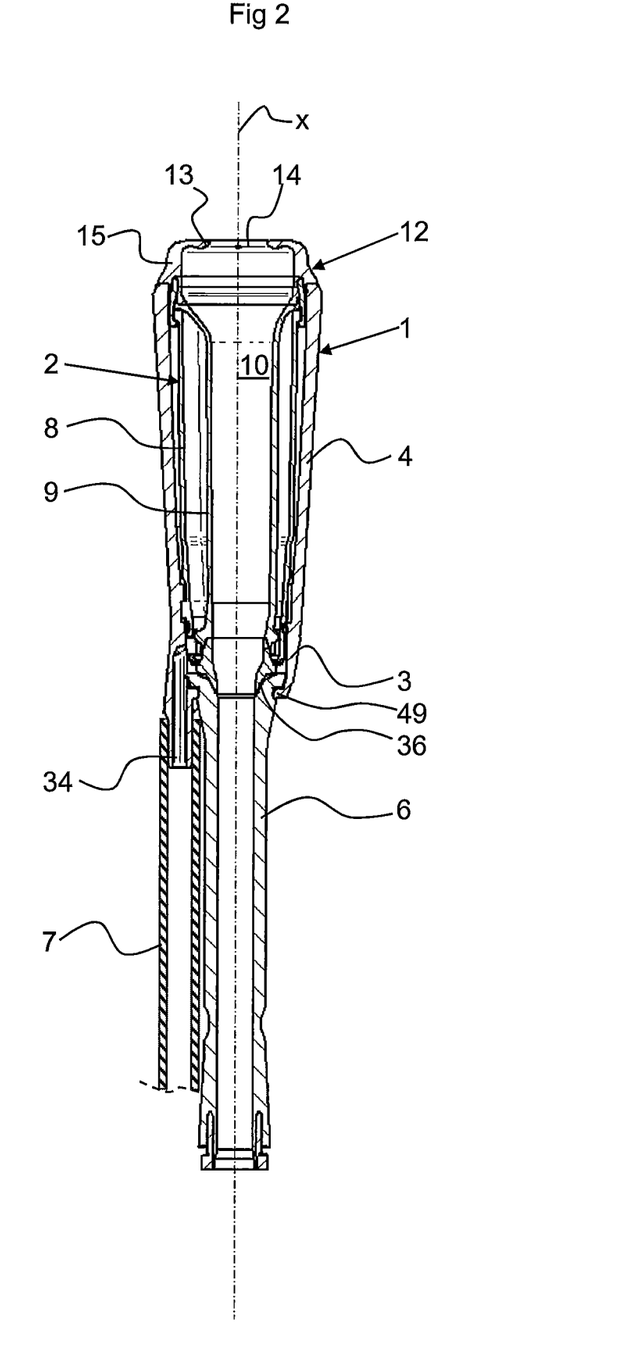
FIG. 2 discloses a longitudinal sectional view of the teatcup along the line II-II in FIG. 1.
Figures 3, 4:
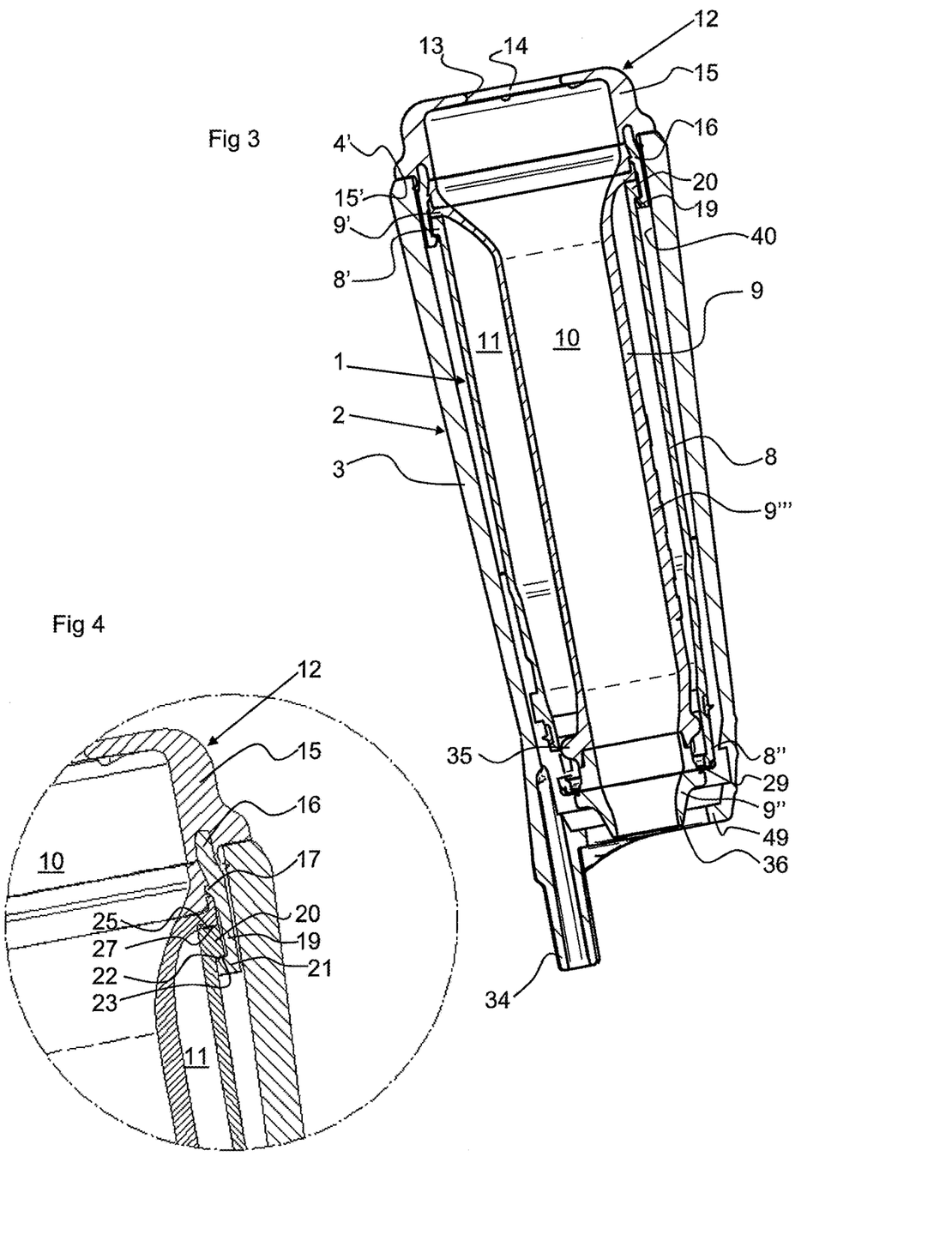
FIG. 3 discloses a longitudinal sectional view of the teatcup in FIG. 1 disconnected from milk and pulse conduits.
FIG. 4 discloses a longitudinal sectional view of an upper part of the teatcup in FIG. 1.

The connector 2 comprises a lower base member 3 and a shell 4. The shell 4 extends from the lower base member 3 and surrounds a receiving space 5 of the connector 2. When the teatcup is assembled, the cartridge 1 is received in the receiving space 5 of the connector as can be seen in FIGS. 2 and 3.

In the embodiments disclosed, the lower base member 3 and the shell 4 form one integrated part, and may be made of one piece of a material, for instance a plastic material.

Throughout the application, the word "upper" indicates a position closer to the udder of the animal during the milking when the teatcup is attached to the teat of an animal in comparison to the word "lower" that indicates a position more remote from the udder during the milking of the animal.

The teatcup may comprise or be connected to a milk conduit 6, such as a short milk conduit or a long milk conduit, and to a pulse conduit 7.

A longitudinal central axis x extends through and along the teatcup, i.e. through the cartridge 1 and the connector 2. The longitudinal central axis x may also extend through and along at least a part of the milk conduit 6 when it is in a rest state as indicated in FIG. 2.

The cartridge 1 comprises an elongated sleeve 8 and a barrel 9. The elongated sleeve 8 extends in parallel with the longitudinal central axis x and has an upper end section 8' and a lower end section 8". The barrel 9 is pre-mounted in the elongated sleeve 8 and has an inner space 10 for receiving the teat. A pulsation chamber 11 is formed and enclosed between an inner surface of the elongated sleeve 8 and an outer surface of the barrel 9.

The cartridge 1 also comprises a head member 12, which comprises a lip 13 surrounding and defining an opening 14 to the inner space 10 for the introduction of the teat into the inner space 10.

The head member 12 is provided at the upper end section 8' of the elongated sleeve 8, and is attached to the barrel 9.

The head member 12 comprises a lip element 15 comprising the lip 13 and a ring member 16 attached to the lip element 15 and comprising an engagement element 17, see FIG. 4. The engagement element 17 attaches the head member 12 to the barrel 9. The engagement element 17 is configured as an annular protrusion extending inwardly into a groove in the barrel 9 as can be seen in FIG. 4. The groove may be annular extending around an outer surface of the barrel 9.

The lip element 15 is made of a relatively elastic material, whereas the ring member 16 is made of a relatively rigid material.

The head member 12 comprises a plurality of locking members 19, in the embodiments disclosed four locking members 19. The locking members 19 are separated from each other, preferably equidistantly separated from each other, and are thus uniformly distributed along the periphery of the head member 12.

The locking members 19 are comprised by the ring member 16 and extends towards the lower end section 8" outside the barrel 9 as can be seen in FIG. 4.

The elongated sleeve 8 has a flange 20, which may be annular and extend outwardly and around at the upper end section 8' of the elongated sleeve 8. Each of the locking members 19 is gripping the flange 20, and extends beyond the flange 20.

Each of the locking members 19 comprises an inwardly extending portion 21 which comprises an engagement surface 22 turned away from the lower end section 8". Each of the locking members 19 may comprise or be configured as a hook, as can be seen in FIGS. 3 and 4.

The flange 20 comprises a lower surface 23 turned towards the lower end section 8".

Each of the engagement surfaces 22 abuts the lower surface 23 when the locking members 19 of the head member 12 are gripping the flange 20. The lower surface 23 may comprise a plurality of surface portions, wherein each of the engagement surfaces 22 abuts a respective one of the surface portions. The surface portions may lie in the same plane, for instance the same radial plane, as the lower surface 23, or may be axially displaced with respect to the lower surface 23.

Figure 5:
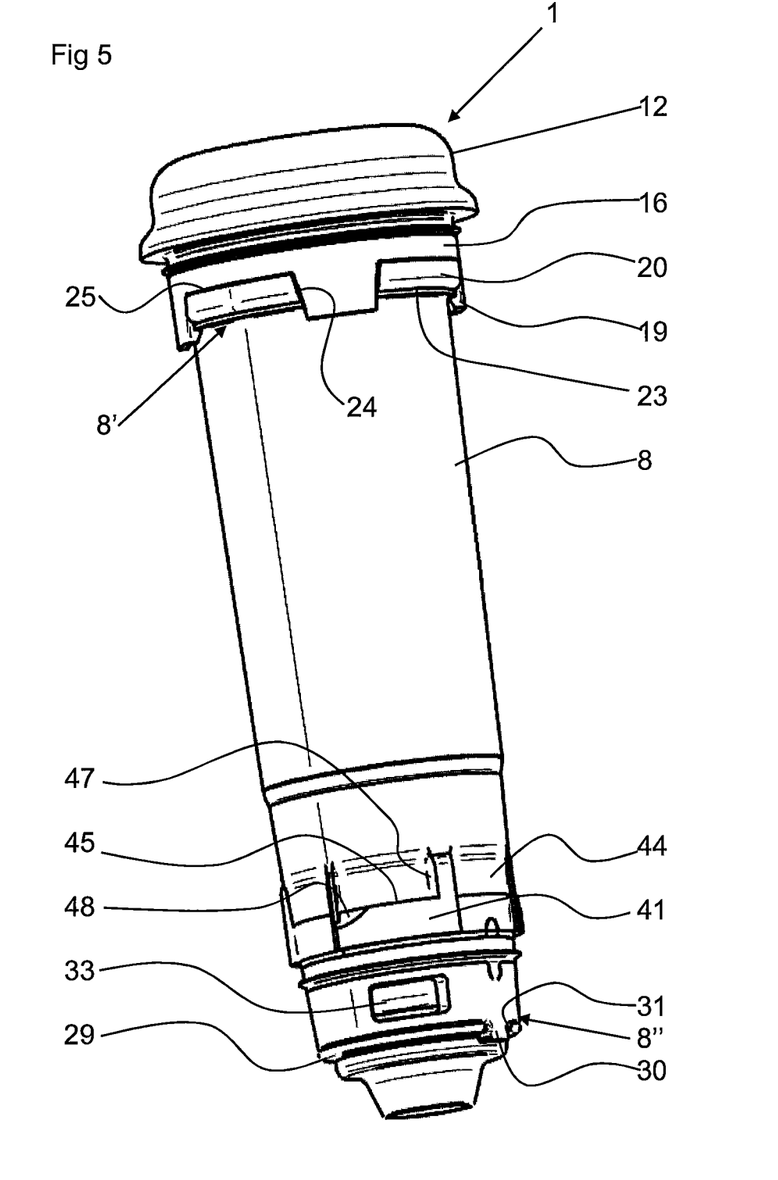
FIG. 5 discloses a perspective view of a cartridge of the teatcup in FIG. 1.
Figure 6:
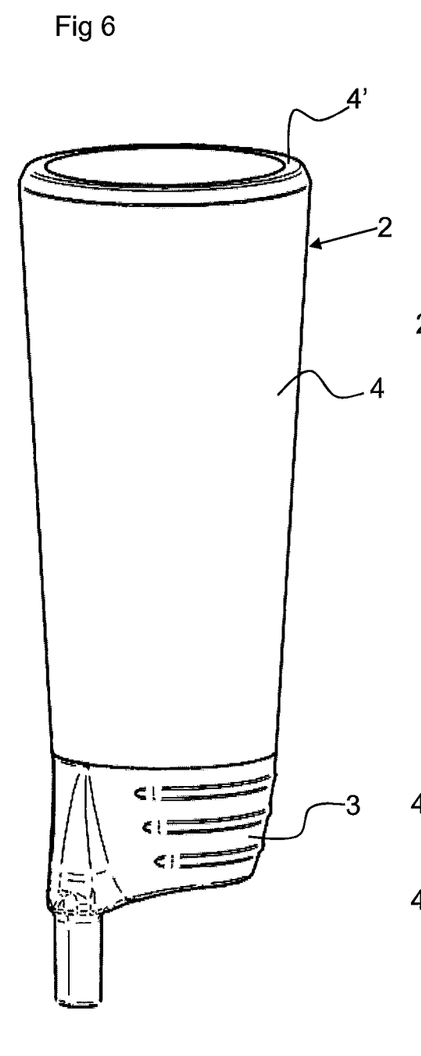
FIG. 6 discloses a side view of a connector of the teatcup in FIG. 1.
Figure 8:
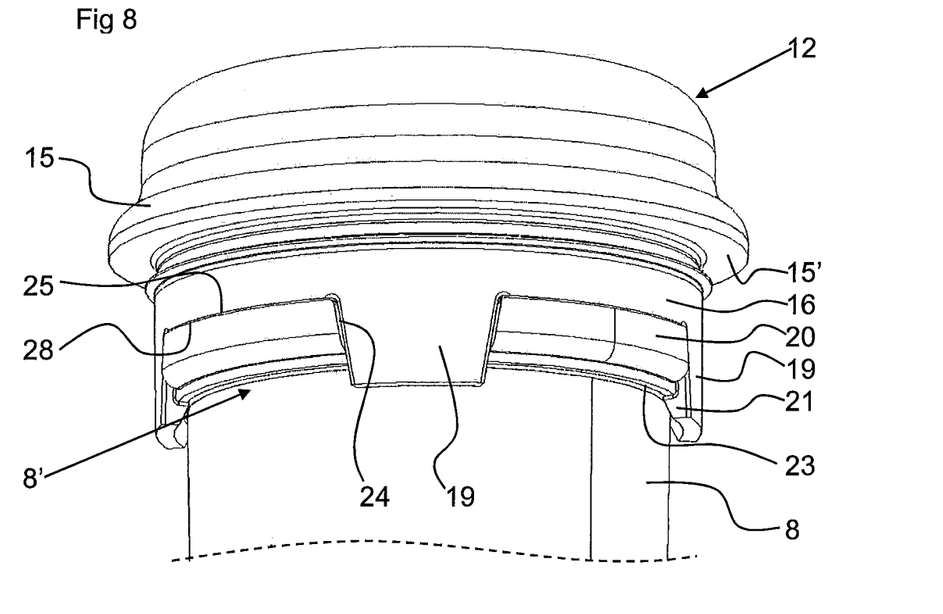
FIG. 8 discloses a perspective view of an upper part of the cartridge in FIG. 4.

The flange 20 comprises a plurality of recesses 24, in the embodiments disclosed four recesses 24, see FIGS. 5 and 8. The recesses 24 are separated from each other, preferably equidistantly separated from each other, and may thus be uniformly distributed along the periphery of the flange 20.

The flange 20 has an upper surface 25 facing away from the lower end section 8". The upper surface 25 may be opposite to the lower surface 23 of the flange 20. The upper surface 25 may extend in parallel with, or substantially in parallel with, a radial plane with regard to the longitudinal central axis x.

Each of the recesses 24 extends through the upper surface 25 and in parallel with the longitudinal central axis x. Each of the locking members 19 is received in a respective one of the recesses 24.

Each of the recesses 24 has a tapering shape towards the lower end section 8', and each of the locking members 19 has a corresponding tapering shape towards the lower end section 8", see FIGS. 5 and 8. The tapering shape of the recesses 24 and the locking members 19 facilitates introduction of the locking members 19 into the recesses 24, and contributes to a firm engagement of each of the locking members 19 in the respective recess 24.

The barrel 9 comprises an upper end portion 9' located at the upper end section 8' of the elongated sleeve 8, a lower end portion 9" located at the lower end section 8" of the elongated sleeve 8, and a barrel portion 9''' extending between the upper end portion 9' and the lower end portion 9", see FIG. 3.

The barrel portion 9''' is made of a relatively elastic material, whereas the upper end portion 9' and the lower end portion 9" are made of a relatively rigid material.

The upper end portion 9' of the barrel 9 has an abutment surface 27 extending outwardly and turned towards the lower end portion 9" and the lower end section 8", see FIG. 4. Also the ring member 16 has an abutment surface 28 turned towards the lower end section 8" and lying in a common plane with the abutment surface 27 of the upper end portion 9' of the barrel 9, see FIG. 8. The abutment surface 27 of upper end portion 9' and the abutment surface 28 of the ring member 16 abut the upper surface 25 of the flange 20, as can be seen in FIGS. 4 and 8.

In the embodiments disclosed, the barrel portion 9''' has, in a rest state, a triangular cross-sectional shape defining three corner portions and three side portions, as is indicated in FIG. 2. Each side portion is straightened and extends between and connects two of the three corner portion. It should be noted that the barrel portion 9''' also may have any other suitable polygonal cross-sectional shape or a circular cross-sectional shape.

The lower end portion 9" of the barrel 9 comprises a stop flange 29 extending outwardly, see FIGS. 3 and 5. The stop flange 29 abuts an end surface of the lower end section 8" of the elongated sleeve 8, and maintains the axial position of the lower end portion 9" in relation to the elongated sleeve 8.

A protrusion 30 extends downwardly from the end surface of the lower end section 8" of the elongated sleeve 8. The protrusion 30 may have a dovetail shape, as can be seen in FIG. 5. The protrusion 30 fits into a recess 31 in the stop flange 29 when the barrel 9 is mounted in the elongated sleeve 8 to prevent the barrel 9 from being rotated and twisted around the longitudinal central axis x in relation to the elongated sleeve 8. The protrusion 30 and the recess 31 may thus define the rotary position of the barrel 9 in the elongated sleeve 8. It should be noted that more than one protrusion 30 and recess 31 may be provided.

Figure 9:
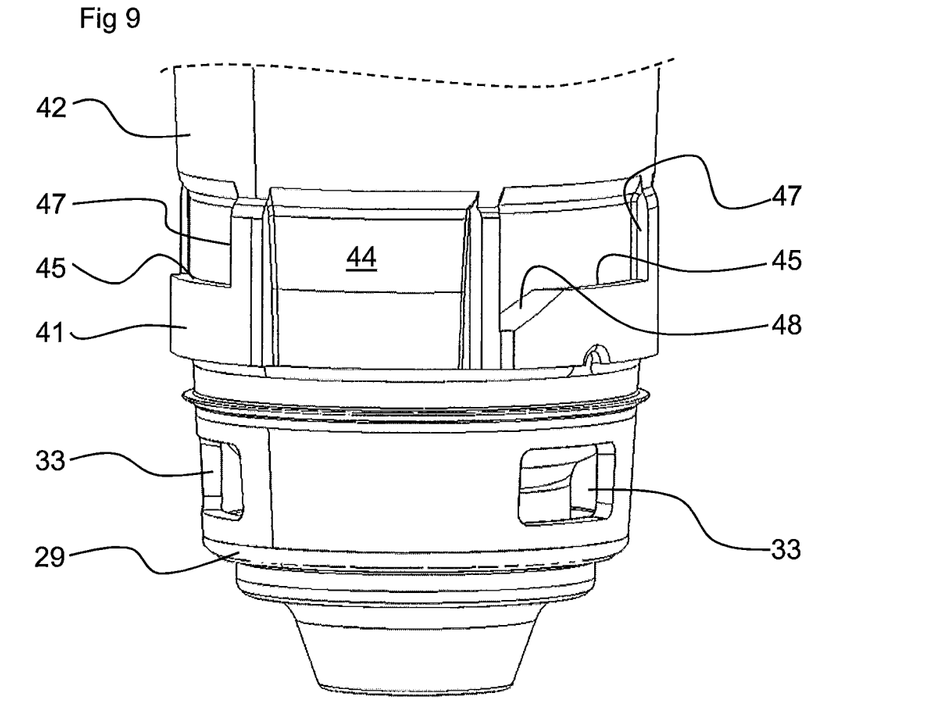
FIG. 9 discloses a perspective view of a lower part of the cartridge in FIG. 4.

In the embodiment disclosed, the elongated sleeve 8 comprises three openings 33, see FIGS. 3 and 9, at the lower end section 8". The openings 33 are distributed, preferably equidistantly distributed, around the lower end section 8" of the elongated sleeve 8. Each of the openings 33 permits passage of a pulsating pressure into and out from the pulsation chamber 11 via a pulse nipple 34 and the pulse conduit 7. Although the number of openings 33 could be another than three, it is preferable if the number of openings 33 is the same as the number of side portions of the barrel portion 9''' of the barrel 9.

The barrel portion 9''' comprises a protruding ring 35 projecting outwardly and extending around the barrel portion 9''' in the proximity of the lower end portion 9''. The protruding ring 35 comprises three straightened portions, which each is axially, or substantially axially, aligned with a respective one of the side portions of the barrel portion 9'''. The protruding ring 35 thus has a polygonal shape corresponding to the polygonal shape of the barrel portion 9''' above the protruding ring 35. Each of the straightened portion of the protruding ring 35 is located partly opposite to a respective one of the openings 33. Furthermore, the barrel 9, in particular the lower end portion 9'', comprises or forms a milk outlet nozzle 36.

When the cartridge 1 is received in the connector 2, the shell 4 extends from the lower end section 8'' to the upper end section 8' of the elongated sleeve 8. The elongated sleeve 8 is thus protected by the shell 4. Furthermore, the locking members 19 are located inside and adjacent to an inner surface 40 of the shell 4 when the cartridge 1 is received in the receiving space 5 of the connector 2. The shell 4 will thus prevent the locking members 19 from moving outwardly and thus from leaving the engagement of the flange 20.

When the cartridge 1 is received in the receiving space 5 of the connector 2, only the lip element 15 of the head member 12 extends above and beyond an upper end surface 4' of the shell 4.

The lip element 15 has a lower surface 15' that abuts the upper end surface 4' of the shell 4 when the cartridge 1 is received in the connector 2. The abutment of the lower surface 15' against the upper end surface 4' contributes to seal the receiving space 5 from the environment.

Figure 7:
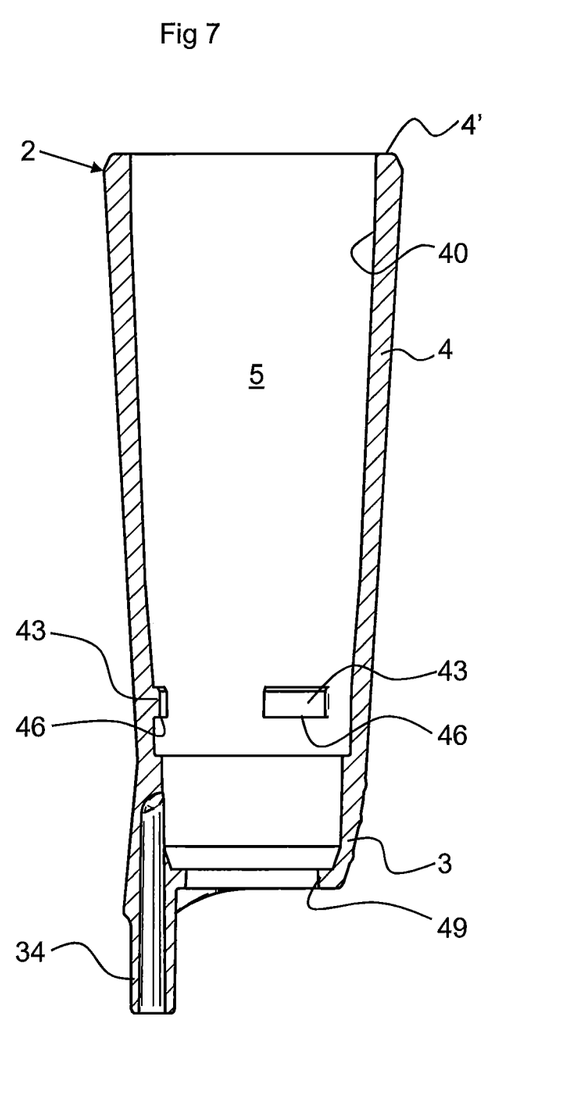
FIG. 7 discloses a longitudinal sectional view of the connector in FIG. 6.

A plurality of coupling members 41 are provided on an outer surface 42 of the elongated sleeve 8, see FIG. 9, and a plurality of complementary coupling members 43 are provided on the inner surface 40 of the shell 4 of the connector 2, see FIG. 7. Each of the coupling members 41 form a bayonet coupling with a respective one of the complementary coupling members 43 to permit locking of the cartridge 1 in the connector 2.

A passage 44 is provided between each of the coupling members 41 to permit a respective on of the complementary coupling members 43 to pass when the cartridge 1 is introduced into the receiving space 5 of the connector 2 along a direction parallel with the longitudinal central axis x. The cartridge 1 may thus be introduced into the connector 2 along said direction until the coupling member 1 has passed beyond the complementary coupling member 43 to a final axial position.

Each of the coupling members 41 comprises an upper surface 45 turned away from the lower end section 8'' to permit engagement by the complementary coupling member 43. When the cartridge 1 has reach the final axial position along said direction, it may be rotated in relation to the connector 2, wherein the upper surface 45 of each coupling members 41 may slide on a lower surface 46 of a respective one of the complementary coupling members 43.

In the embodiments disclosed, each of the coupling members 41 comprises a stop surface 47 extending from the upper surface 45 and being parallel with the longitudinal central axis x. The stop surface 47 provides or defines the final rotary position of the cartridge 1 after the rotation of the cartridge 1 around the longitudinal central axis x in relation to the connector 2.

Furthermore, each of the coupling members 41 comprises a sloping ramp 48 extending to the upper surface 45 to permit sliding of the complementary coupling member 43 onto the upper surface 45. The sloping ramp 48 may facilitate for the upper surface 45 of the cartridge 1 to reach the lower surface 46 of the connector 1, and thus the sloping ramp 48 may facilitate the initial part of said rotation of the cartridge 1 in relation to the connector 2.

The connector 2 comprises a bottom flange 49 extending inwardly towards the longitudinal central axis x, especially radially inwardly. The flange 49 may engage a corresponding groove in an upper portion of the milk conduit 6 in order to releasably attach the connector 2 to the milk conduit 6 as can be seen in FIG. 2.

The cartridge 1 is assembled by attaching the head member 12 to the barrel 9, wherein the engagement element 17 engages the groove on the outer side of the barrel 9. The barrel 9, with the head member 12 attached thereto, is then mounted in the elongated sleeve 8, by means of a suitable tool, so that the stop flange 29 is pressed beyond the lower end of the elongated sleeve 8. The stop flange 29 then flexes outwardly to lock the stop flange 29 against the lower end of the elongated sleeve 8, wherein the relative rotary positions of the elongated sleeve 8 and the barrel 9 are adjusted to permit the protrusion 30 to engage the recess 31. At the same time the locking members 19 are introduced into the recesses 24 until the engagement surfaces 22 passes beyond the lower surface 23 of the flange 20. The locking members 19 will then flex inwardly to permit the engagement surfaces 22 in order to abut the lower surface 23.

The cartridge 1 may then be mounted in the connector 2 by being introduced along a direction being parallel to the longitudinal central axis x. The cartridge 1 is held in a rotary position so that the complementary coupling members 43 may pass through the passages 44. When the cartridge 1 cannot be moved any further, when the milk outlet nozzle 36 abuts an inner inlet surface of the milk conduit 6, the cartridge 1 is rotated in relation to the connector 2, wherein the lower surface 46 of the complementary coupling members 43 will slide on the sloping ramp 48 and then on the upper surface 45 until the complementary coupling member 43 at a final position reaches the stop surface 47. When the cartridge 1 has reach the final position in the connector 2, the complementary coupling member 43 thus abuts the upper surface 45 and the stop surface 47 of the coupling member 41. The milk outlet nozzle 36 is in this final position pressed against the inner inlet surface of the milk conduit 6 as can be seen in FIG. 2.

The present invention is not limited to the embodiments disclosed and described herein, but may be modified and varied within the scope of the following claims.

It should be noted that the sloping ramp 48 could as an alternative be provided on the complementary coupling member 43 and then extend to the lower surface 46.

Furthermore, the stop surface 47 could as an alternative be provided on and extend downwardly from the lower surface 46 of the complementary coupling member 43.

The stop surface 47 does not have to extend all the way from the upper surface 45 or from the lower surface 46, but may start at a distance from any one of this surfaces 45, 46.

The complementary coupling member 43 has in the embodiments disclosed a rectangular shape seen in a radial direction. It should be noted that the complementary coupling member 43 may instead have other shapes, such as a circular shape.

The invention claimed is:

1. A cartridge (1) for a teatcup that attaches to a teat of an animal to be milked, the cartridge (1) comprising:
    an elongated sleeve (8) extending in parallel with a longitudinal central axis (x) and having an upper end section and a lower end section, the elongated sleeve (8) presenting an outwardly extending flange (20) formed by an increased thickness of the elongated sleeve (8) at the upper end section thereof;

a barrel (9) pre-mounted in the elongated sleeve (8) and having an inner space (10) for receiving said teat;

a pulsation chamber (11) formed between an inner surface of the elongated sleeve (8) and an outer surface of the barrel (9); and a head member (12) comprising a lip (13) surrounding an opening (14) to the inner space (10), wherein the head member (12) is provided at the upper end section (8'), wherein the head member (12) comprises a plurality of locking members (19) each gripping the flange (20), wherein each of the locking members (19) extends towards the lower end section (8") and beyond the flange (20), wherein each of the locking members (19) comprises an inwardly extending portion (21) which comprises an engagement surface (22) turned away from the lower end section (8"), wherein a plurality of coupling members (41) are provided on an outer surface (42) toward the lower end section (8") of the elongated sleeve (8), configured to engage with complementary coupling members (43) on an inner surface (40) of a connector (2) of the teatcup, and wherein each of the coupling members (41) is arranged to form a bayonet coupling with a respective one of the complementary coupling members (43) to permit locking of the cartridge (1) in the connector (2).

2. The cartridge (1) according to claim 1,
wherein the flange (20) comprises a lower surface (23) turned towards the lower end section (8"), and
wherein each of the engagement surfaces (22) abuts the lower surface (23).

3. The cartridge (1) according to claim 1, wherein the head member (12) is attached to the barrel (9).

4. The cartridge (1) according to claim 3,
wherein the head member (12) comprises a lip element (15), incorporating the lip (13), and a ring member (16) attached to the lip element (15) and incorporating the locking members (19) and an engagement element (17), and
wherein the engagement element (17) attaches the head member (12) to the barrel (9).

5. The cartridge (1) according to claim 1,
wherein the flange (20) is annular and comprises a plurality of recesses (24), and
wherein each of the locking members (19) is received in a respective one of the recesses (24).

6. The cartridge (1) according to claim 5,
wherein the flange (20) has an upper surface (25) facing away from the lower end section (8"), and
wherein each of the recesses (24) extends through the upper surface (25) and in parallel with the longitudinal central axis (x).

7. The cartridge (1) according to claim 5,
wherein each of the recesses (24) has a tapering shape towards the lower end section (8'), and
wherein each of the locking members (19) has a corresponding tapering shape towards the lower end section (8").

8. The cartridge (1) according to claim 1, wherein a passage (44) is provided between each of the coupling members (41) to permit a respective one of the complementary coupling members (43) to pass when the cartridge (1) is introduced into a receiving space (5) of the connector (2).

9. The cartridge (1) according to claim 1, wherein each of the coupling members (41) comprises an upper surface (45) turned away from the lower end section (8") to permit engagement by a lower surface (46) of a respective one of the complementary coupling members (43).

10. The cartridge (1) according to claim 9, wherein the coupling members (41) comprise a stop surface (47) to provide a final rotary position.

11. The cartridge (1) according to claim 9, wherein the coupling members (41) comprise a sloping ramp (48) to permit sliding of the complementary coupling member (43) onto the upper surface (45).

12. A teatcup configured to be attached to the teat of an animal to be milked and comprising a connector (2) and a cartridge (1) according to claim 1.

* * * * *